United States Patent [19]

DeMoss

[11] 3,737,582

[45] June 5, 1973

[54] FLAT MAGNETIC HEADS

[75] Inventor: Dean L. DeMoss, Camarillo, Calif.

[73] Assignee: Minnesota Mining and Manufacturing Company, St. Paul, Minn.

[22] Filed: May 2, 1968

[21] Appl. No.: 726,058

[52] U.S. Cl. ..................................179/100.2 C, 179/100.2 P; 340/174.1 F

[51] Int. Cl. ..............................................G11b 5/24

[58] Field of Search .................179/100.2 C, 100.2 P; 340/174.1 E, 174.1 F; 346/74 MC

[56] References Cited

UNITED STATES PATENTS

| | | | |
|---|---|---|---|
| 3,478,340 | 11/1969 | Schwartz et al. | 340/174.1 |
| 3,479,662 | 11/1969 | Bradford et al. | 340/174.1 |
| 3,414,895 | 12/1968 | Allen | 179/100.2 |

FOREIGN PATENTS OR APPLICATIONS

| | | | |
|---|---|---|---|
| 776,348 | 6/1957 | Great Britain | 177/100.2 |

*Primary Examiner*—J. Russell Goudeau
*Attorney*—Smyth, Roston & Pavitt

[57] ABSTRACT

This invention is directed to a magnetic transducing head for use with a moving magnetic recording medium. Specifically, the invention is directed to a physical construction for the magnetic transducing head for providing an improved contact between the magnetic medium and the magnetic transducing head wherein the magnetic transducing head includes a sharp leading edge constructed of wear-resistant material and wherein the leading edge forms an included angle of 90° or greater between the magnetic medium and the leading edge so that as the magnetic medium passes over the sharp leading edge, the leading edge removes air from the surface of the magnetic medium, which removal of air produces a pressure differential in a direction to urge the magnetic medium into contact with the face of the magnetic transducing head. Generally, the invention may also provide for a flat face for the magnetic transducing head so as to maintain the close contact between the magnetic medium and the face of the magnetic transducing head.

6 Claims, 4 Drawing Figures

PATENTED JUN 5 1973 3,737,582

INVENTOR:
Dean L. DeMoss

By Smyth, Roston & Pavitt
ATTORNEYS

FLAT MAGNETIC HEADS

Magnetic recording and reproducing systems are increasingly used for the storage of information. For example, video information is commonly stored on magnetic tape so that this video information may then be replayed at a later time. As the use of magnetic recording and reproducing increases, it becomes necessary to provide for a proper recording and reproduction of relatively short wave length information.

The shorter the wavelength of the information that the magnetic transducing head is to record or play back, the more critical becomes the contact between the magnetic transducing head and the recording medium. As an example, if the information to be recorded includes signals having a wavelength of 60 microinches, it is important to have extremely intimate contact between the transducing head and the recording medium. At the wavelength of 60 microinches, a 60-microinch separation between the recording medium and the transducing head would cause a drop of over 50 decibels in signal. It is obviously desirable to maintain the drop in signal as small as possible and it is, therefore, important to maintain an intimate contact between the transducing head and the recording medium so that the loss in signal may be kept as small as possible. Therefore, it is desirable to provide for magnetic transducing heads which can record and play back short wave length information.

The prior art systems of maintaining the recording medium in contact with the transducing head generally involved one or more of the following concepts. First, the transducing head was provided with a radius at the face of the head and the recording medium such as the magnetic tape was pulled down on the face of the head by providing a tension in the tape. It, therefore, became important to maintain the tension in the tape constant or the contact between the tape and the head varied. Also, the tension in the tape must be maintained relatively high, especially at high speeds for the tape, since at the higher speeds air is apparently dragged along with the tape between the tape and the head interface, with the result that the tape loses contact with the transducing head.

A second concept is to use a pressure pad which pushes the tape against the transducing head. The use of a pressure pad has been unsatisfactory since it is very difficult to provide for a pressure pad which produces uniform and constant pressure and, therefore, the pressure pads of the prior art often cause irregular wear of the transducing head. A third concept is to control the air layer between the tape and the head by evacuating the air between the tape and the transducing head by the use of a vacuum-producing means. However, the prior art systems all were relatively complex in that a separate vacuum means had to be provided and somehow attached to the head and all this increased the complexity and cost of the transducing system.

The present invention provides for a simple, reliable, physical construction for a transducing head which produces a pressure differential in a direction to maintain the recording medium in contact with the face of the transducing head. This pressure differential, however, is accomplished automatically and without the use of external vacuum-producing means. Specifically, the invention includes a wear-resistant leading edge for the transducing head where wherein the leading edge forms an included angle of 90° or greater with the recording medium such as the magnetic tape so that as the tape passes over the leading edge the air on the surface of the tape is removed. The leading edge may form an included angle greater than 90° with the recording medium so that the leading edge is self-sharpened as it is worn down by the passage of the magnetic recording medium. Also, the face of the magnetic transducing head of the present invention may be flat and the magnetic recording medium may form an included angle of slightly less than 180° with the flat face of the transducing head so as to insure good contact between the leading edge and the recording medium.

The present invention also provides for a structure wherein the wear-resistant leading edge may be formed of an insert formed of a very hard material such as carbide. The insert may have a small back angle, such as 5°, in order to provide for an included angle of greater than 90° between the leading edge and the magnetic medium.

Other details of the invention will become apparent with reference to the following description and drawings wherein.

Figure 1:
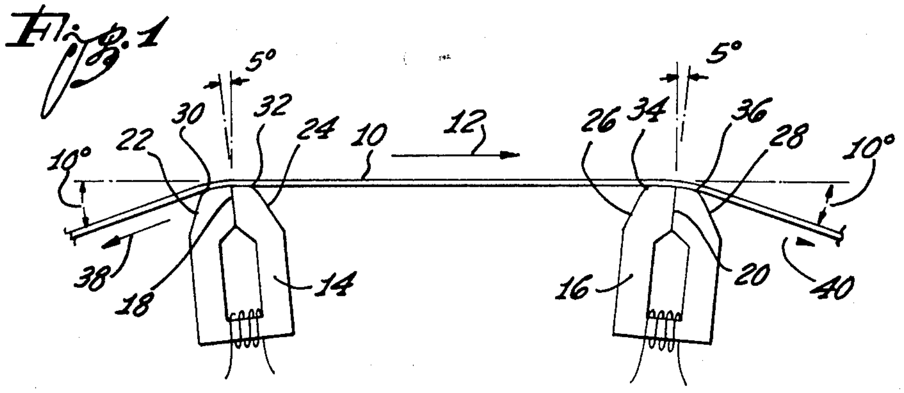
FIG. 1 illustrates a prior art system for maintaining contact between a recording medium and a transducing head.

In FIG. 1, a magnetic recording medium such as a magnetic tape 10 is shown moving in a direction indicated by the arrow 12. The magnetic recording tape 10 includes a layer of iron oxide in a known manner so as to provide for the storage of magnetic information. The tape 10 passes over a pair of magnetic transducing heads 14 and 16. The magnetic transducing heads 14 and 16 each include air gaps 18 and 20, which air gaps are used for recording or reproducing information on the magnetic tape 10. The air gaps may be filled with a non-magnetic material so as to present a smooth face for the magnetic tape 10. As can be seen in FIG. 1, the heads 14 and 16 are offset from a vertical axis by some angle, which angle is shown to be 5° in FIG. 1. The tape 10 is offset from a horizontal axis by some angle, for example, 10°, so that the tape is offset from the face of the head by 5° on both sides of each of the transducing heads 14 and 16.

The face of the transducing heads 14 and 16 include sloping areas 22, 24, 26 and 28 and usually a small curvature is provided between the face of the transducing head and the sloping sides. For example, the areas 30, 32, 34 and 36 are provided with a small curvature so that the tape flows smoothly against the face of the heads 14 and 16. Often the entire face of the transducing head has a curvature.

Also, in the prior art the head-to-tape contact is provided by creating a tension in the tape as shown by the arrows 38 and 40. Therefore, as can be seen in FIG. 1, the tape is pulled down against the face of the heads due to the angular relationship and the tension in the tape. In addition to the above, pressure pads are sometimes used to push the tape against the heads.

For lower speeds of the tape, the system shown in FIG. 1 produces a relatively good contact between the tape and the head. In addition, for relatively long wave length information, the contact between the tape and the head is not critical and the system of FIG. 1 operates in a reliable fashion. However, with shorter wave length information and especially at high speeds, a layer of air is apparently dragged with the tape into the tape head interface, which layer of air results in a loss of contact between the tape and the head. The prior art solution was to increase the tension so as to increase the unit area of pressure against the head up to 40–50 ounces per square inch of tape. However, this increase of tension provides for greatly increased wear of the transducing head and still the contact was erratic.

Figure 2:
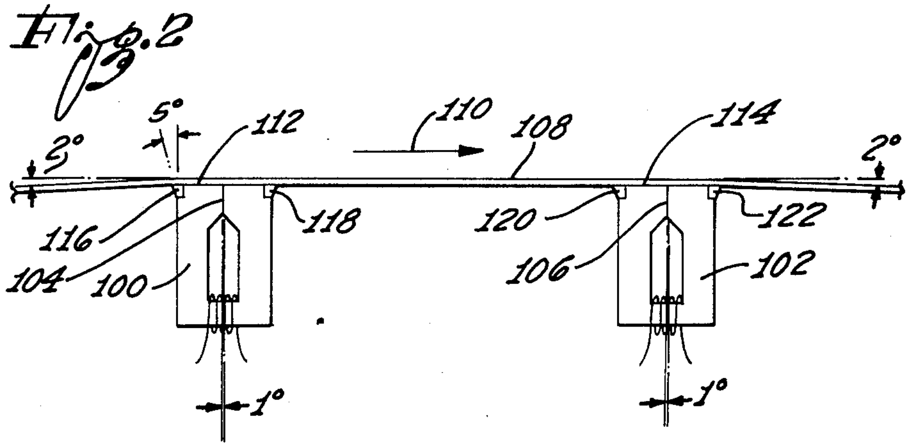
FIG. 2 illustrates a first embodiment of the invention for replacing the system of FIG. 1.

A first embodiment of the present invention is shown in FIG. 2. As can be seen in FIG. 2, a pair of transducing heads 100 and 102 include air gaps 104 and 106. These air gaps may be filled with a non-magnetic material so as to provide a smooth surface for the passage of a magnetic tape 108. The magnetic tape 108 may be moving in a direction shown by the arrow 110.

The faces of the transducing heads 100 and 102 are substantially flat, as shown by the substantially flat faces 112 and 114. The leading and trailing edges of the flat faces include high wear-resistant inserts 116, 118, 120 and 122. These inserts may be constructed of a high wear-resistant material such as carbide. It is to be appreciated that the magnetic heads 100 and 102 may be constructed entirely of a high wear-resistant material or the edge of the heads may be treated to exhibit high wear-resistant properties. It is also to be appreciated that, although the leading and trailing edges of the transducing heads 100 and 102 are shown to have inserts, if the tape is only to be moved in a single direction, only the leading edges need have these high wear-resistant inserts. An advantage in having only the leading edge be sharp and equipped with an insert is air flotation is provided in the conventional manner when the tape is run in the opposite direction, as in rewinding, thus resulting in less head wear and lower rewind tape tension. However, in some instances the tape 108 may be recorded and/or reproduced in both directions and the use of the double inserts provides for greater flexibility.

The inserts such as represented by insert 116 have a leading edge which is provided with a back angle. For example, as shown in FIG. 2, a back angle of 5° is provided so that any wear on the sharp edge portion of the insert 116 provides for a self-sharpening of the edge. Also, in order to insure a proper contact between the tape 108 and the sharp edge of the insert 116, the heads 100 and 102 are all offset slightly from the vertical axis. For example, as shown in FIG. 2, the heads 100 and 102 are each offset 1° from the vertical axis. The magnetic tape 102, therefore, is offset slightly from the horizontal axis, for example, by 2° so that the tape 108 and the flat faces 112 and 114 form an included angle of slightly less than 180°.

As the tape 108 moves, for example in the direction 110, the sharp edge portion of the insert tends to remove or scrape air from the surface of the tape. As the air is removed from the surface of the tape, a pressure differential is developed in a direction to urge the tape 108 against the flat faces 112 and 114 of the transducing heads 100 and 102. Specifically, since a portion of the air between the tape and the flat faces of the heads is removed, the atmospheric pressure or a portion of the atmospheric pressure is used to maintain the contact between the magnetic tape 108 and the flat faces of the transducing heads 100 and 102. The atmospheric pressure or a portion of it, therefore, serves as a very accurate, constant and uniform pressure pad.

The contact between the tape and the head appears to be somewhat independent of tape tension, since measurements have been taken wherein the tension in the tape has been varied and these variations in tape tension did not appear to produce any variation in the separation of the tape from the head. The structure of the present invention also appears to operate over a very wide tape speed range and very good recording and reproduction of short wave length information has been accomplished using the flat face magnetic transducing heads of the present invention.

Figure 3:
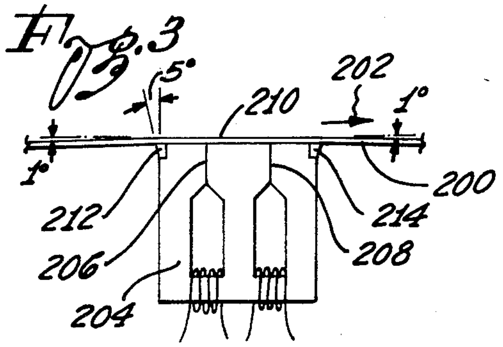
FIG. 3 illustrates a second embodiment of the invention incorporating a dual transducing head.

A second embodiment of the invention is shown in FIG. 3. In FIG. 3 a magnetic tape 200 may be moved in a direction shown by the arrow 202. A magnetic transducing head 204 includes a pair of air gaps 206 and 208. These air gaps may be filled with a non-magnetic material to insure a smooth face for the transducing head 204. The transducing head includes a substantially flat face 210.

The magnetic transducing head 204 also includes high wear-resistant inserts 212 and 214 at the leading and trailing edges. These high wear-resistant inserts as shown by insert 212 include a back angle, for example, a back angle of 5°, so as to provide for a self-sharpening of the inset as the tape wears down the sharp edge portion of the insert. The tape 200 may be offset slightly from the horizontal axis so as to provide for a good contact between the tape and the sharp edge portion of the insert, for example, the insert 212. As shown in FIG. 3, this offset is 1° so that the included angle between the tape 200 and the flat face 210 is slightly less than 180°.

As indicated above with reference to FIG. 2, as the tape 200 moves in the direction 202, the sharp edge of the insert 212 removes air from the surface of the tape so as to provide for a pressure in a direction to maintain the tape 200 in intimate contact with the flat face 210. Variations in tape tension produce substantially no variations in tape-head separation and a transducing head constructed in accordance with the teaching of FIG. 3 operated to record and reproduce information over relatively great variations in tape speed. It is to be appreciated that although the embodiment in FIG. 3 is shown with high wear-resistant inserts 212 and 214, the transducing head 204 may be constructed of a high wear-resistant material so that the inserts would not be necessary.

Figure 4:
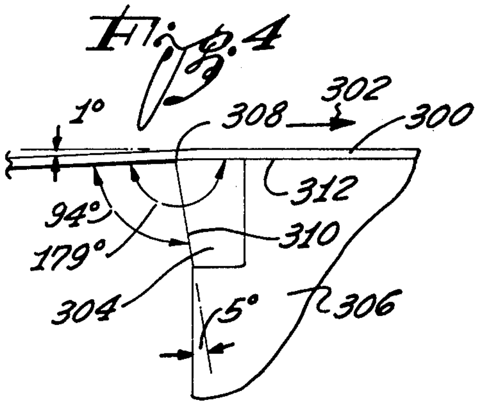
FIG. 4 illustrates a fragmentary enlarged view of the insert of wear-resistant material that is shown in FIGS. 2 and 3 and specifically illustrating the angular relationships between the leading edge, the recording medium and the flat face.

FIG. 4 illustrates in greater detail representative angular relationships between the tape and the high wear-resistant insert. As an example, in FIG. 4 the tape 300 may be moving in a direction shown by the arrow 302. An insert 304 is provided in a magnetic transducing head 306. The insert may be constructed of a high wear-resistant material such as a carbide. As shown in FIG. 4, the insert 304 has a back angle from the vertical of some small amount such as 5°. This provides for self sharpening of the sharp edge portion 308 of the insert 304. Also, the tape 300 is offset slightly from the horizontal, for example, by 1°, so that good contact is assured between the sharp edge portion 308 and the tape 300. As can be seen in the example of FIG. 4, the included angle between the tape and a leading edge 310 of the insert 304 is slightly greater than 90°, and in particular, 94°. It is to be appreciated that the invention is not limited to that particular angular relationship, but it is noted that the structure of the invention appears to improve in performance if the angular relationship between the tape 300 and the leading edge 310 is at least 90° or greater.

Also, as shown in FIG. 4, the angular relationship between the tape 300 and the flat face 312 of the head 306 is that of slightly less than 180°. Again, the particular angular relationship is not critical but it has been observed that the invention works best when the angular relationship between the tape 300 and the flat face 312 is slightly less than 180° in order to insure a good contact between the tape 300 and the sharp edge portion 308.

The present invention therefore, provides for an improved wideband magnetic transducing head, including a wear-resistant leading edge, which leading edge removes air from the surface of a recording medium such as a magnetic tape in order to produce a pressure differential and urge the tape into intimate contact with the face of the reproducing head. Particular angular relationships have been disclosed, but it is to be appreciated that the invention is not to be limited to these specific angular relationships. Also, the invention has been described with reference to a flat face but it is obvious that the invention may apply to other configurations for the face of the magnetic head. As an example, the invention may be used with a radiused face for the magnetic head. While this description suggests magnetic tape moving with respect to a stationary magnetic head, obviously the improved magnetic head described in this invention could move with respect to a stationary or slowly moving magnetic tape. Rotating heads are commonly employed in "helical" scan video tape recorders, an application well suited to the described invention. It is also to be appreciated that, although the invention has been disclosed and described with reference to particular embodiments, various adaptations and modifications may be made and the invention, therefore, is only to be limited by the appended claims.

What is claimed is:

1. In a magnetic transducing head for use with a relatively moving magnetic recording medium, physical construction for providing an improved contact between the magnetic medium and the magnetic head, the magnetic head having leading and trailing edges, including a flat face for the magnetic transducing head between the leading and trailing edges at the head, the leading edge for the flat face being wear-resistant and being shaped relative to the head and to the recording medium and being in contact with the recording medium to remove air from the surface of the recording medium adjacent to the flat face and to provide a pressure differential between the recording medium and the flat face of the transducing head at the leading edge to maintain the recording medium in contact with the flat face of the magnetic transducing head, the leading edge for the flat face being defined by an insert having higher wear-resistant properties than other materials located along the flat face of the magnetic transducer.

2. In the magnetic transducing head of claim 1 wherein the leading edge for the flat face forms an angle of 90° or greater with the recording medium to facilitate the removal of air from the surface of the recording medium adjacent to the flat face.

3. In the magnetic transducing head of claim 1 wherein the recording medium forms an angle with the flat face of slightly less than 180° to insure contact between the leading edge and the recording medium.

4. In a magnetic transducing head for use with a relatively moving magnetic recording medium, physical construction for providing an improved contact between the magnetic medium and the magnetic head, the magnetic head having leading and trailing edges, including a flat face for the magnetic transducing head between the leading and trailing edges at the head, the leading edge for the flat face being wear-resistant and being shaped relative to the head and to the recording medium and being in contact with the recording medium to remove air from the surface of the recording medium adjacent to the flat face and to provide a pressure differential between the recording medium and the flat face of the transducing head at the leading edge to maintain the recording medium in contact with the flat face of the magnetic transducing head, the leading edge for the flat face forming an angle of greater than 90° with the recording medium to produce a self sharpening of the leading edge.

5. A magnetic transducing head for use with a relatively moving magnetic recording medium and for providing an improved contact between the magnetic medium and the magnetic head, the magnetic head having leading and trailing edges and a face adjacent the recording medium, including the leading edge for the magnetic transducing head being sharp and the face of the head between the leading and trailing edges being flat and the magnetic head having an air gap between the leading and trailing edges and with the magnetic medium passing over and in contact with the leading edge and with the leading edge being shaped relative to the face of the head and to the medium to remove air between the surface of the recording medium and the leading edge of the magnetic head to produce a pressure differential for maintaining the magnetic medium in contact with the magnetic head at the leading edge and at the air gap of the magnetic head, the leading edge forming an angle of greater than 90° with the recording medium to produce a self sharpening of the leading edge.

6. A magnetic transducing head for use with a relatively moving magnetic recording medium and for providing an improved contact between the magnetic medium and the magnetic head, the magnetic head having leading and trailing edges, including a flat face for the magnetic transducing head between the leading and trailing edges and with the magnetic medium passing over the flat face, a sharp-edged wear-resistant insert located at the leading edge of the flat face of the magnetic head and with the insert forming an angle of at least 90° with the magnetic medium and with the sharp edge of the insert removing air from the surface of the magnetic medium to produce an excess air pressure on the medium at the surface opposite from the head to urge the magnetic medium in contact with the flat face for the magnetic head, the insert forming an angle of greater than 90° with the magnetic medium to produce a self sharpening of the insert.

* * * * *